Patented Dec. 10, 1935

2,023,566

UNITED STATES PATENT OFFICE 2,023,566

PROCESS FOR PREPARING TERTIARY-BUTYL-META-XYLENE

Walter V. Wirth, Woodstown, N. J., assignor to E. I. du Pont de Nemours & Company, Wilmington, Del., a corporation of Delaware No Drawing. Application February 23, 1934, Serial No. 712,605

6 Claims. (Cl. 260—168)

This invention relates to the preparation of an organic compound. More particularly, it relates to an improved process for the manufacture of 5-tertiary-butyl-1,3-xylene of the formula:

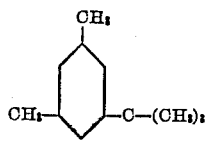

hereinafter designated as tert-butyl-m-xylene.

Tert-butyl-m-xylene has been prepared in the art by the Friedel-Craft synthesis; that is, by reacting m-xylene with tertiary-butyl-chloride in the presence of aluminum chloride. A detailed description of this process is given in Ullmann's Enzyklopaedie der Technischen Chemie, 1st edition, vol. 9, page 615. The yield by this process is however, very low, being about 56% of theory based on the quantity of tert-butyl chloride employed.

Although several other processes have been suggested, none of these are of practical value, either because of low yields or because of high cost of initial materials required.

It is accordingly an object of my invention to improve the Friedel-Craft's synthesis as applied to the manufacture of tert-butyl-m-xylene, whereby to obtain the latter in good yield and in economical manner. Other and further important objects of this invention will appear as the description proceeds.

I have found that the yield of tert-butyl-m-xylene in the reaction above referred to is materially influenced by the temperature at which the condensation is effected and by the proportion of aluminum chloride present in the mass. Contrary to expectations, the yield is affected adversely by an increase either in the temperature or in the quantity of aluminum chloride—two factors which in the average reaction favor high yields. It seems that the low yield of the process in the art is to be attributed to the formation of by-products, and that diminishing the temperature or decreasing the amount of aluminum chloride discourages the formation of by-products, without seriously affecting the yield of the desirable main product.

It will be understood, of course, that the explanation just offered constitutes merely theory and does not bind my invention or the claims hereinafter following. Whatever the correct theory may be, I found that if the tertiary-butyl-group is introduced into meta-xylene by the action of tertiary-butyl-chloride in the presence of the minimum quantity of aluminum chloride, and the temperature is held below 50° C., and preferably below 30° C., a smooth reaction to 5-tertiary-butyl-m-xylene is obtained with a minimum formation of by-products. The quantity of $AlCl_3$ used should not exceed 10 per cent of the weight of the tertiary-butyl-chloride, and preferably should not exceed 2 per cent.

It will be noted that in the process described in Ullmann, the temperature was allowed to rise to about 67° C., and the quantity of aluminum chloride therein specified was augmented by a quantity formed during the course of the reaction from aluminum turnings and hydrochloric acid.

The two factors mentioned affect the yield independently, and one may be used to compensate for the other. Thus, provided the temperature is kept low, say around 25–30° C., the quantity of aluminum chloride may vary somewhat, say up to 10% by weight of the tert-butyl chloride. But best results are obtained by controlling both factors.

Without limiting my invention to any particular procedure, the following examples, in which parts by weight are given, will serve to illustrate my preferred mode of operation:

Example I

An enameled kettle, equipped with an agitator and cooling jacket was charged with 50 parts of m-xylene and 1.5 parts of anhydrous aluminum chloride, with stirring. A solution of 100 parts of m-xylene and 92.5 parts of tertiary-butyl-chloride was gradually added over a period of 2½ hours, keeping the reaction mass at 25° C. HCl gas evolved during this process was allowed to escape. The stirring was continued for 15 minutes at 25° C., and the mass was then heated over a period of 15 minutes to 50° C. The charge was then run into 250 parts of cold water at 10° C. in an agitated open enameled kettle and stirred for 10 minutes. The mass was settled for ½ hour, and the bottom aqueous layer was drawn off from the top oil layer. The oil was washed with water until free of acid.

This oil, which constituted a solution of tert-butyl-m-xylene in excess xylene, was fractionally distilled, partly under atmospheric pressure and partly under a vacuum, as follows:

| Cut | Pressure | Temperature | Weight | Composition |
|---|---|---|---|---|
| | | °C. | Parts | |
| 1 | Atmospheric | 135 to 145 | 41.5 | m-xylene. |
| 2 | 53-55 mm | up to 110 | 7.0 | m-xylene and tert-butyl-m-xylene. |
| 3 | 53-55 mm | 110 to 115 | 148 | tert-butyl-m-xylene |
| Still residue | | | 4.0 | |

The second cut may be saved for addition to a subsequent distillation batch. The total yield of tert-butyl-m-xylene by this process was about 94% of theory based on the initial quantity of tert-butyl chloride. The losses of xylene, except for the quantity actually consumed in the reaction, was trivial. Moreover, the tert-butyl-m-xylene thus obtained was of sufficient purity to be used directly for nitration in the preparation of musk-xylene.

*Example II*

The procedure was followed as directed in Example I, but instead of heating to 50° C. after the addition of the components, the mass was stirred for four to five hours at 25° C. and then drowned in water. The yields and quality of product were about the same as given in Example I.

*Example III*

All the m-xylene and aluminum chloride were charged into the reaction vessel and tert-butyl-chloride was added alone, following in the remainder the procedure of Example I. The yield was over 90%.

It will be understood that the excess of xylene over the tertiary-butyl-chloride employed can be varied within wide limits, and that the time involved in the various steps can likewise be varied.

Many other variations and modifications will be readily apparent to those skilled in the art.

The advantages of my improved procedure will now be readily apparent.

1. A high quality product is obtained by my procedure in much higher yields than those heretofore recorded in a process using the same materials.

2. Not only is the yield and quality higher, but the process is much simpler and more economical to operate on a large scale.

3. The fact that the tertiary-butyl-m-xylene made by my invention is pure enough to use in musk xylene manufacture after one fractional distillation is a decided advantage over the published method of Ullmann, which necessitates two distillations.

I claim:

1. In the process of preparing tert-butyl-m-xylene, by reacting with tert-butyl-chloride upon m-xylene in the presence of aluminum chloride, the improvement which comprises carrying out the entire reaction at a temperature below 50° C., and limiting the proportion of aluminum chloride to below 2% by weight of the tert-butyl-chloride employed.

2. A process for preparing tert-butyl-m-xylene, which comprises adding tert-butyl-chloride to an excess of m-xylene containing about 2% by weight of aluminum chloride, maintaining a temperature of about 25° C. during the mixing of the materials, and finishing the reaction at a temperature not exceeding 50° C.

3. A process for preparing tert-butyl-m-xylene, which comprises feeding gradually a mixture of tert-butyl-chloride and m-xylene into a mixture of m-xylene and aluminum-chloride at a temperature of about 25° C., the quantity of aluminum chloride being not over 2% by weight of the tert-butyl-chloride employed, diluting the reaction mass with water, separating the oily layer, and subjecting the latter to fractional distillation under a vacuum to recover tert-butyl-m-xylene.

4. A process as in claim 3, the quantities of total m-xylene, tertiary-butyl-chloride, and aluminum chloride employed being substantially in the ratio of 150:92:1.5.

5. A process for preparing tert-butyl-m-xylene, which comprises feeding gradually a mixture of tert-butyl-chloride and m-xylene into a mixture of m-xylene and aluminum-chloride at a temperature of about 25° C., the quantity of aluminum chloride being not over 2% by weight of the tert-butyl-chloride employed, heating the mass for a short interval of time to about 50° C., diluting the reaction mass with water, separating the oily layer, and subjecting the latter to fractional distillation under a vacuum to recover tert-butyl-m-xylene.

6. A process as in claim 5, the quantities of total m-xylene, tertiary-butyl-chloride, and aluminum chloride employed being substantially in the ratio of 150:92:1.5.

WALTER V. WIRTH.